United States Patent
Colonna et al.

(10) Patent No.: US 10,793,259 B2
(45) Date of Patent: Oct. 6, 2020

(54) AUTOMATIC PILOT DEVICE FOR A ROTARY WING AIRCRAFT AND ROTARY WING AIRCRAFT COMPRISING SUCH DEVICE

(71) Applicant: THALES, Courbevoie (FR)

(72) Inventors: François Colonna, Toulouse (FR); Gilles Thouvenot, Valence (FR); Alain Auger, Merignac (FR)

(73) Assignee: Thales, Courbevoie (FR)

( * ) Notice: Subject to any disclaimer, the term of this patent is extended or adjusted under 35 U.S.C. 154(b) by 427 days.

(21) Appl. No.: 15/904,205

(22) Filed: Feb. 23, 2018

(65) Prior Publication Data
US 2018/0257762 A1  Sep. 13, 2018

(30) Foreign Application Priority Data

Mar. 7, 2017  (FR) ...................................... 17/00225

(51) Int. Cl.
*B64C 13/18* (2006.01)
*G05D 1/00* (2006.01)
(Continued)

(52) U.S. Cl.
CPC .............. *B64C 13/18* (2013.01); *B64C 27/04* (2013.01); *B64C 27/57* (2013.01); *B64C 27/82* (2013.01); *G05D 1/0077* (2013.01); *G05D 1/101* (2013.01)

(58) Field of Classification Search
CPC ...... B64C 13/18; B64C 27/57; G05D 1/0077; G05D 1/101
See application file for complete search history.

(56) References Cited

U.S. PATENT DOCUMENTS 5,806,805 A   9/1998  Elbert et al.
7,021,587 B1 * 4/2006  Younkin ............... B64C 13/505
                                                                  244/178
(Continued)

FOREIGN PATENT DOCUMENTS

DE  10 2011 115 359  4/2013
FR   2 711 432        4/1995
FR   2 981 044        4/2013

OTHER PUBLICATIONS

Preliminary Search Report dated Dec. 8, 2017 from application No. FR 1700225.

*Primary Examiner* — Brian M O'Hara
(74) *Attorney, Agent, or Firm* — Knobbe, Martens, Olson & Bear, LLP

(57) ABSTRACT

An automatic pilot device for a rotary wing aircraft and rotary wing aircraft comprising such device are disclosed. In one aspect, the automatic pilot device comprises at least one automatic pilot assembly including at least two primary actuators, at least one or each of the primary actuators incorporating an electronic computation unit. The computation unit is configured to: communicate with a measuring system configured to generate measuring signals and/or a cockpit configured to generate control signals as a function of the actions by a crew, and compute, as a function of the measuring signals and/or control signals, a piloting setpoint for the primary actuator incorporating the computation unit and/or a piloting setpoint for at least one or each other primary actuator of the automatic pilot assembly, for the piloting of the aircraft by the automatic pilot device.

11 Claims, 1 Drawing Sheet

(51) Int. Cl.
*B64C 27/57* (2006.01)
*G05D 1/10* (2006.01)
*B64C 27/04* (2006.01)
*B64C 27/82* (2006.01)

(56) References Cited

U.S. PATENT DOCUMENTS 10,023,306 B2 * 7/2018 Eglin ..................... B64C 27/22
10,473,485 B2 * 11/2019 Cantaloube .......... G05D 1/0077

* cited by examiner

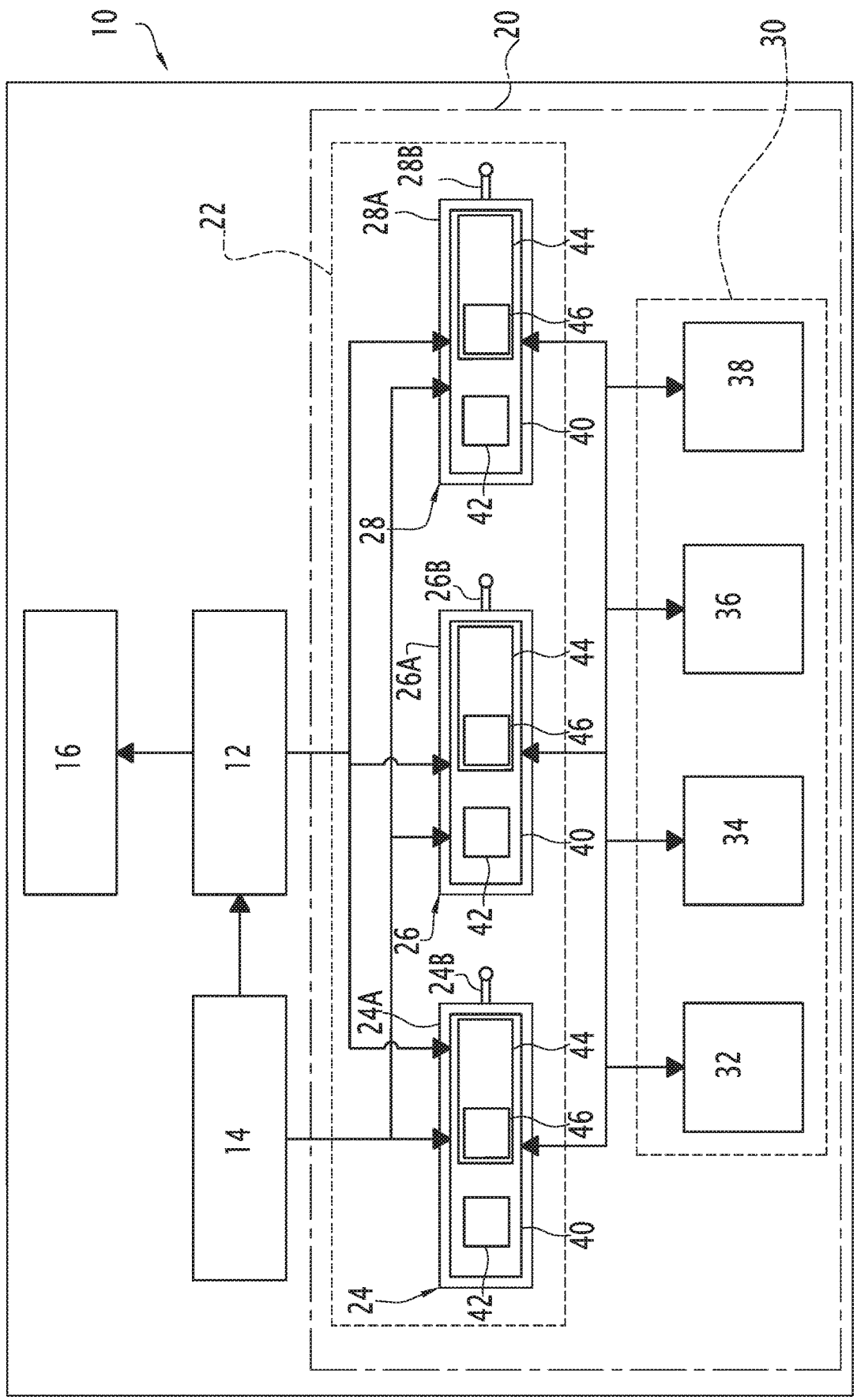

AUTOMATIC PILOT DEVICE FOR A ROTARY WING AIRCRAFT AND ROTARY WING AIRCRAFT COMPRISING SUCH DEVICE

CROSS-REFERENCE TO RELATED APPLICATIONS

This patent application claims the benefit under 35 U.S.C. § 119 of French Application No. FR 17 00225 filed on Mar. 7, 2017 which is hereby incorporated by reference in its entirety.

BACKGROUND

Technological Field

The described technology generally relates to the field of automatic pilot devices for a rotary wing aircraft, such as a helicopter.

Description of the Related Technology

A helicopter automatic pilot device may have several operating modes depending on the level of intervention of the automatic pilot device. An automatic pilot device for a helicopter may have a piloting assistance mode in which the automatic pilot device helps maintain the position of the helicopter as a function of commands given by the pilot and therefore stabilizes the helicopter, a low-level guide mode, in which the helicopter automatic pilot device ensures guiding of the helicopter, for example to maintain a heading, an altitude or a horizontal speed, and a high level guide mode in which the automatic pilot device pilots the helicopter to perform certain maneuvers.

It is possible to provide a helicopter automatic pilot device comprising, on the one hand, actuators arranged to control the helicopter, and on the other hand, one or several computers configured to compute piloting setpoints of the actuators, i.e., position setpoints of the actuators.

SUMMARY OF CERTAIN INVENTIVE ASPECTS

One of the aims of the described technology is to propose an automatic pilot device that is lightweight while being robust in terms of flight safety.

To that end, one aspect includes an automatic pilot device for a rotary wing aircraft, comprising at least one automatic pilot assembly, each automatic pilot assembly comprising at least two primary actuators configured to act on the aircraft, in which at least one or each of the primary actuators incorporates an electronic computation unit configured to:

communicate with the measuring system onboard the aircraft configured to generate measuring signals representative of flight parameters of the aircraft, on the one hand, and/or a cockpit usable by a crew to pilot the aircraft and configured to generate control signals as a function of the actions by the crew, on the other hand, and compute, as a function of the measuring signals and/or control signals, a piloting setpoint for the primary actuator incorporating this computation unit and/or a piloting setpoint for at least one or each other primary actuator of the automatic pilot assembly, for the piloting of the aircraft by the automatic pilot device.

The computation of piloting setpoints by one or several computing units integrated into one or several primary actuators of the automatic pilot device makes it possible to limit the weight of the automatic pilot device. Furthermore, this eliminates communication lag times.

The automatic pilot device can be made robust, in particular when the automatic pilot device is based on at least two integrated computing units that can perform redundant computations, make comparisons and/or monitor the operation of the various primary actuators.

In specific embodiments, the automatic pilot device comprises one or several of the following optional features, considered alone or according to all technically possible combinations:

at least one of the computation units is configured to compute a piloting setpoint for the primary actuator integrating this computation unit, the primary actuator being configured to apply this piloting setpoint;

each primary actuator incorporates one of the computation units configured to compute a piloting setpoint for the primary actuator incorporating this computation unit and/or a piloting setpoint for at least one or each other primary actuator of the automatic pilot assembly;

each primary actuator is configured to apply a piloting setpoint computed by one of the computation units integrated into this primary actuator;

at least one or each primary actuator is configured to provide a flight direction setpoint, and to control the display of the setpoint on a flight director;

at least one of the computation units is configured to compute, for the primary actuator incorporating this computation unit and/or for at least one or each other primary actuator of the automatic pilot assembly, a command piloting setpoint and a monitor piloting setpoint according to two different ways;

the automatic pilot assembly comprises a primary actuator configured to act on the roll of the aircraft, a primary actuator configured to act on the pitch of the aircraft and/or a primary actuator configured to act on the yaw of the aircraft;

it comprises a compensating assembly comprising at least one compensating actuator, at least one of the computation units integrated into a primary actuator being configured to compute a compensating setpoint for at least one or each compensating actuator;

one of the computation units is configured to compute, for the primary actuator incorporating this computation unit and/or for at least one or each other primary actuator of the automatic pilot assembly, a guiding setpoint for guiding of the aircraft by the automatic pilot device; and it comprises at least two automatic pilot assemblies, the respective primary actuators of which are provided to act in parallel on the aircraft.

The described technology also relates to a rotary wing aircraft comprising an onboard measuring system configured to measure flight parameters of the aircraft, a cockpit usable by a crew to pilot the aircraft and an automatic pilot device as defined above.

BRIEF DESCRIPTION OF THE DRAWINGS

The described technology and its advantages will be better understood upon reading the following description, provided solely as an example, and done in reference to the FIG. 1, which is a schematic view of a rotary wing aircraft comprising an automatic pilot device.

DETAILED DESCRIPTION OF CERTAIN INVENTIVE EMBODIMENTS

The continuation of the description refers to the usual orthogonal coordinate system for aircrafts comprising a roll axis, a pitch axis and a yaw axis.

The rotary wing aircraft 10 of FIG. 1 is for example a helicopter comprising at least one lift rotor. The aircraft 10 may comprise one or several lift rotors. When the aircraft 10 comprises a single lift rotor, it generally comprises an anti-torque rotor.

The aircraft 10 comprises a cockpit 12 allowing the crew to pilot the helicopter. Traditionally, the cockpit 12 comprises primary control members able to be manipulated by the crew to pilot the aircraft 10. The primary control members for example comprise a joystick for acting on the roll and pitch of the aircraft, a rudder bar for acting on the yaw of the aircraft, and a collective control handle for modifying the lift generated by the rotary wing, for example for modifying the ascension speed of the aircraft 10.

The cockpit 12 is configured to generate control signals (or "command signals") as a function of the actions by the crew.

The aircraft 10 comprises an onboard measuring system 14 configured to measure flight parameters of the aircraft 10. The measuring system 14 for example comprises an inertial unit (also generally referred to as an inertial sensor), anemobarometric sensors, a satellite geolocation system, a set of marker beacon receivers, an altitude and heading reference system (AHRS), a set of sensors on three axes making it possible to define the position of an airplane in space owing to the accelerations and the magnetic fields that they undergo, etc.

The flight parameters for example comprise the ground speed, the airspeed, the altitude, the flight altitude above the ground, the geographical position in latitude/longitude, the attitude (pitch, roll, yaw), the heading, etc.

The measuring system 14 is configured to generate measuring signals representative of the measured flight parameters.

The aircraft 10 comprises a display device 16 making it possible to display information for the crew. The display device 16 in particular makes it possible to display information relative to the flight parameters and/or information relative to the commands carried out by the crew.

The display device 16 for example receives the control signals generated by the cockpit 12 and the measuring signals generated by the measuring system 14, via the cockpit 12.

The aircraft 10 comprises an automatic pilot device 20 configured to act on the aircraft 10 in order to stabilize the aircraft 10, i.e., to assist the crew in maintaining a flight configuration, and/or to act on the aircraft to guide the aircraft 10 partially or completely autonomously, i.e., to maintain a heading, maintain an altitude, maintain a longitudinal or vertical speed, follow a two-dimensional or three-dimensional trajectory, maintain a position (stationary flight), etc.

The automatic pilot device 20 comprises an automatic pilot assembly 22 comprising at least one primary actuator 24, 26, 28, each primary actuator 24, 26, 28 being arranged to act on the aircraft 10 to stabilize the aircraft 10 and/or to guide the aircraft 10.

In some embodiments, the automatic pilot assembly 22 comprises at least one primary roll actuator 24 configured to act on the roll of the aircraft 10 and at least one primary pitch actuator 26 configured to act on the pitch of the aircraft 10.

The primary roll actuator 24 and the primary pitch actuator 26 of each automatic pilot assembly 22 are for example configured to act on the incline of a cyclic swashplate of a lift rotor of the aircraft 10.

The primary roll actuator 24 and the primary pitch actuator 26 are necessary to allow the automatic pilot device 20 to stabilize the aircraft 10.

A rotary wing aircraft 10, such as a helicopter, is unstable in flight by nature. In some embodiments, the automatic pilot device 20 is always active to stabilize the aircraft 10.

In the illustrated example, the automatic pilot assembly 22 further comprises a primary yaw actuator 28 configured to act on the yaw of the aircraft 10.

When the aircraft 10 is a helicopter having a lift rotor and an anti-torque rotor, the primary yaw actuator 28 is configured to act on the antitorque rotor.

Each primary actuator 24, 26, 28 comprises a body 24A, 26A, 28A and a moving actuating member 24B, 26B, 28B.

In the illustrated example, each primary actuator 24, 26, 28 is a linear actuator. Each primary actuator 24, 26, 28 is a jack. The moving actuating member 24A, 26A, 28A is a rod translatable relative to the body 24A, 26A, 28A of the primary actuator 24, 26, 28.

The automatic pilot device 20 comprises a compensating assembly 30 comprising secondary compensating actuators 32, 34, 36, 38.

Each secondary actuator 32, 34, 36, 38 is configured to act on the aircraft so as to maintain a predefined attitude of the aircraft 10 by default, in the absence of action by the crew and primary actuators 24, 26, 28.

The compensating assembly 30 comprises at least one secondary roll actuator 32 configured to act on the roll of the aircraft 10 and a secondary pitch actuator 34 configured to act on the pitch of the aircraft 10. Optionally, the compensating assembly 30 comprises a secondary yaw actuator 36 arranged to act on the yaw of the aircraft 10.

The compensating assembly 30 here comprises a secondary attitude control actuator 38 arranged to modify the lift generated by the lift rotor of the aircraft 10.

The secondary actuators 32, 34, 36, 38 are configured to act on the aircraft 10 with a time constant greater than that of the primary actuators 24, 26, 28.

As illustrated in FIG. 1, the automatic pilot assembly 22 has no primary attitude control actuator, only the secondary attitude control actuator 38 acting on the aircraft 10. The action on the attitude control with a relatively large time constant is sufficient, such that a primary attitude control actuator is not necessary.

The compensating actuators 32, 34, 36, 38 are for example rotary actuators.

At least one or each primary actuator 24, 26, 28 incorporates (or "integrates") an electronic computation unit 40 (also generally referred to as a computer).

In the illustrated example, each primary actuator 24, 26, 28 of the piloting assembly 22 incorporates a computation unit 40. Alternatively, only one or two of the primary actuators 24, 26, 28 incorporate(s) a computation unit 40.

Each computation unit 40 is integrated into the corresponding primary actuator 24, 26, 28. Each computation unit 40 integrated into a primary actuator 24, 26, 28 here is housed in the body 24A, 26A, 28A of this primary actuator 24, 26, 28.

Each computation unit 40 is in communication with the cockpit 12 to receive control signals generated by the cockpit 12, on the one hand, and to the measuring system 14 to receive measuring signals generated by the measuring system 14, on the other hand. In one alternative, the measuring signals generated by the measuring system 14 pass through the cockpit 12, which processes them and reorients them toward the computation unit 40.

Each computation unit 40 is configured to determine, as a function of the control signals and/or measuring signals, at least one piloting setpoint of at least one primary actuator 24, 26, 28 of the automatic pilot assembly 22.

A "piloting setpoint" of a primary actuator 24, 26, 28 designates a setpoint to be applied by the primary actuator 24, 26, 28 for piloting of the aircraft by the automatic pilot device 20.

In some embodiments, at least one or each computation unit 40 is configured to determine, as a function of the control signals and/or measuring signals, at least one piloting setpoint of at least one primary actuator 24, 26, 28 integrating this computation unit 40.

Also, in some embodiments, each primary actuator 24, 26, 28 incorporating a computation unit 40 is configured to apply the piloting setpoint computed by this computation unit 40.

In one embodiment, each computation unit 40 is configured to compute a command piloting setpoint (called piloting setpoint "COM") and a monitoring piloting setpoint (called piloting setpoint "MON") for the primary actuator 24, 26, 28 incorporating this computation unit 40, and to compare the command piloting setpoint and the monitoring piloting setpoint.

The command piloting setpoint is intended to be applied by the primary actuator 24, 26, 28. The monitoring piloting setpoint is computed differently from the command piloting setpoint, i.e., from different measuring signals and/or as a function of different equations, and is used to verify the computation of the command piloting setpoint for robustness and reliability reasons.

In case of difference in results between the command piloting setpoint and the monitoring piloting setpoint, the computation unit 40 may for example emit an alert signal or place the primary actuator 24, 26, 28 in alternative, downgraded or faulty mode.

In one example embodiment, at least one or each computation unit 40 incorporated into a primary actuator 24, 26, 28 is configured to determine, as a function of the control signals and/or measuring signals that it receives, at least one piloting setpoint for at least one or each other primary actuator 24, 26, 28 of the automatic pilot assembly 22.

In one embodiment, at least one or each computation unit 40 incorporated into a primary actuator 24, 26, 28 is configured to compute a command piloting setpoint and a monitoring piloting setpoint for at least one or each other primary actuator 24, 26, 28 of the automatic pilot assembly 22 to which the primary actuator 24, 26, 28 incorporating this computation unit 40 belongs.

In some embodiments, each computation unit 40 computes two piloting setpoints for each primary actuator 24, 26, 28 for which it computes a piloting setpoint, i.e., a command piloting setpoint and a monitoring piloting setpoint.

In some embodiments, at least one or each computation unit 40 of the primary actuator 24, 26, 28 of the automatic pilot assembly 22 is in communication with at least one or each other primary actuator 24, 26, 28 of the automatic pilot assembly 22 to receive operating signals emitted by the other primary actuator 24, 26, 28, and configured to compare the operating signals of the other primary actuator 24, 26, 28 with at least one or each piloting setpoint computed by the computation unit 40 for the other primary actuator 24, 26, 28. Thus, the computation unit 40 of a primary actuator 24, 26, 28 can monitor the operation of another primary actuator 24, 26, 28. The primary actuators 24, 26, 28 monitor one another.

In one particular embodiment, each computation unit 40 integrated with a primary actuator 24, 26, 28 of the automatic pilot assembly 22 is configured to:

compute at least one piloting setpoint for each other primary actuator 24, 26, 28 of the automatic pilot assembly 20, in some embodiments, a command piloting setpoint and a monitoring piloting setpoint for each other primary actuator 24, 26, 28 of the other automatic pilot assembly 20, receive operating signals from each other primary actuator 24, 26, 28 of the automatic pilot assembly 20, and compare the operating signals coming from each other primary actuator 24, 26, 28 with at least one or each piloting setpoint computed by the computation unit 40 for this other primary actuator 24, 26, 28.

In one particular embodiment, each computation unit 40 performs these operations for each other primary actuator 24, 26, 28 of the automatic pilot assembly 22.

As illustrated in FIG. 1, optionally, the compensating actuators 32, 34, 36, 38 of the compensating assembly 30 are in communication with the primary actuators 24, 26, 28 of the automatic pilot assembly 20.

At least one computation unit 40 of a primary actuator 24, 26, 28 of the automatic pilot assembly 20 is configured to compute at least one compensation setpoint of at least one compensating actuator 32, 34, 36, 38, the compensating actuator 32, 34, 36, 38 being configured to act as a function of the compensating setpoint determined by the computing unit 40.

A "compensation setpoint" determined for a compensating actuator 32, 34, 36, 38 is a setpoint for the compensating actuator 32, 34, 36, 38.

In one embodiment, at least one or each computation unit 40 is configured to compute at least one compensation setpoint for each compensating actuator 32, 34, 36, 38.

In one embodiment, the compensating actuators 32, 34, 36, 38 each apply a respective compensation setpoint, the compensation setpoints being computed by a same computation unit 40.

Alternatively, at least two compensating actuators 32, 34, 36, 38 apply respective compensation setpoints computed by respective computing units 40. This makes it possible to distribute the burden of computing the compensation setpoints.

In one particular embodiment, the computation unit 40 of each primary actuator 24, 26, 28 assigned to an axis (roll, pitch, yawl) of the aircraft 10 is configured to compute a compensation setpoint for the secondary actuator 32, 34, 36 assigned to that same axis of the aircraft 10, each secondary actuator 32, 34, 36 assigned to an axis (roll, pitch, yaw) of the aircraft 10 being configured to apply the compensation setpoint computed by the computation unit 40 of the primary actuator 24, 26, 28 assigned to the same axis (roll, pitch, yaw) of the aircraft 10.

In some embodiments, each computation unit 40 configured to compute at least one compensation setpoint for a compensating actuator 32, 34, 36, 38 is configured to compute, for this compensation actuator 32, 34, 36, 38, both a command compensation setpoint and a monitoring compensation setpoint in different ways.

In one embodiment, the computation unit 40 of at least one primary actuator 24, 26, 28 is configured to compute, for at least one or each primary actuator 24, 26, 28 of the automatic pilot assembly 22, guide setpoints.

In each guide mode, the automatic pilot device 20 acts on the aircraft 10 automatically to guide the aircraft 10, i.e., to follow a trajectory.

Each primary actuator 24, 26, 28 can simultaneously apply a piloting setpoint to stabilize the aircraft 10 and a guide setpoint to guide the aircraft 10. The piloting setpoint and the guide setpoint are superimposed.

The automatic pilot modes for example comprise at least one low-level guide mode in which the automatic pilot device 20 acts to capture and/or maintain a heading, a route, an altitude and/or a speed (longitudinal and/or vertical).

The automatic pilot modes for example comprise at least one high-level guide mode in which the automatic pilot device 20 acts to perform a maneuver completely or partially autonomously.

In the case of a maneuver done completely autonomously, in principle, the crew does not intervene, except for example to take over in case of problems.

In the case of a maneuver done partially autonomously, the automatic pilot device 20 performs some of the guide actions autonomously, while the crew performs others of the guide actions through the cockpit 12.

Examples of high-level guide modes are for example hovering flight, automatic landing (ILS), monitoring of a wireless landing beam using a ground beacon of the "Localizer" or "Glideslope" type, a two-dimensional (2D) or three-dimensional (3D) standardized maneuvering trajectory (for example, a search/rescue maneuver of the SAR (Search And Rescue) type, monitoring a radial of a wireless beacon of the VOR/TACAN type, monitoring a speed profile over time, monitoring a flight plan of a flight management system or a mission computer (monitoring of a trajectory connecting waypoints in 2D or 3D, optionally comprising constraints to be respected, such as altitude, speed, angle of arrival, etc. constraints), etc.

The computations for the various guide modes of the aircraft 10 can be done by one or several computation units 40 of the primary actuators 24, 26, 28 of the automatic pilot assembly 22.

The computations of the guide modes can for example be distributed over the computation units 40 of the various primary actuators 24, 26, 28 of the automatic pilot assembly 22, each computation unit 40 being configured to compute the guide setpoint of at least one guide mode, the computation units 40 being configured to compute respective guide mode guide setpoints.

This makes it possible to distribute the computation load over the various computation units 40 of the primary actuators 24, 26, 28 of the automatic pilot assembly.

According to one possible, non-limiting distribution:

the computation unit 40 of the primary roll actuator 24 is configured to compute the guide setpoints of a "HDG" (heading maintenance), "LOC" (following a laser from a beacon of the Localizer type), "VOR" (following a radial relative to a VHF Omnidirectional Range wireless beacon) guide mode;

the computation unit 40 of the primary pitch actuator 26 is configured to compute the guide setpoints of a "IAS" (airspeed maintenance), "ALT" (altitude maintenance), "ALTP" (Preselected altitude capture), "G/S" (monitoring a beam from a beacon of the GlideSlope type) guide mode; and the computation unit 40 of the primary yaw actuator 28 is configured to compute the guide setpoints of a turn coordination guide mode.

Optionally, the computation unit 40 of at least one or each primary actuator 24, 26, 28 of the automatic pilot assembly 22 is configured to compute a flight direction setpoint, provided to control the display of a flight director on the display device 16.

A flight director is an onboard instrument providing a visual aid to the crew by indicating the maneuvers to be applied to keep the aircraft 10 in a determined flight configuration or on a determined trajectory.

The flight director can for example display, on a screen of the display device 16, a depiction of the aircraft 10 and a flight indicator, the crew having to act on the primary control members to make the depiction of the aircraft 10 match the flight indicator to keep the aircraft 10 in the determined flight configuration or on the determined trajectory.

As illustrated in FIG. 1, each computation unit 40 comprises a processor 42 and a memory 44. Each computation unit 40 comprises a computer application 46 comprising code instructions stored in the memory 44 and executable by the processor 42 to perform the computations to be done by the computation unit 40 (piloting setpoint computation, compensation setpoint computation, guide setpoint computation, comparison of a command setpoint and a monitoring setpoint, monitoring of another primary actuator, etc.).

Alternatively or optionally, at least one computation unit 40 comprises a programmable logic component or a dedicated integrated circuit configured to carry out all or some of the computations assigned to this computation unit 40 for the automatic piloting of the aircraft 10.

In FIG. 1, the automatic pilot device 20 comprises a single automatic pilot assembly 22. This is referred to as "simplex" mode in the aeronautics field.

Alternatively, the automatic pilot device 20 comprises two automatic pilot assemblies 22 configured to act in parallel, for redundancy and robustness reasons. This is then called "duplex" or "dual" mode.

Alternatively, the automatic pilot device 20 comprises three automatic pilot assemblies 22 configured to act in parallel, for redundancy and robustness reasons. This is then called "triplex" or "trial" mode.

If the automatic pilot device 20 comprises several automatic pilot assemblies 22, in some embodiments, a control logic of the primary actuators 24, 26, 28 can be established, where one of the automatic pilot assemblies 22 is designated "master" by the crew via the cockpit 12, and controls all of the actuators 24, 26, 28, while the or each other automatic pilot assembly 22 is designated "slave" or "standby" and does not control actuators 24, 26, 28.

If the automatic pilot device 20 comprises several automatic pilot assemblies 22, in one alternative, a control logic of the primary actuators 24, 26, 28 can be established by majority vote.

If the automatic pilot device 20 comprises several automatic pilot assemblies 22, in one alternative, a control logic of the primary actuators 24, 26, 28 can be established by averaging the setpoints.

If the automatic pilot device 20 comprises several automatic pilot assemblies 22, in some embodiments, the automatic pilot assemblies are identical. In particular, the different characteristics indicated above for the automatic pilot assembly 22 are valid for at least one or each of the automatic pilot assemblies.

In one alternative, the automatic pilot assemblies are different, for example in terms of hardware and/or software, but come from identical specifications, thus making it possible to reduce the failures resulting from common failure modes.

The automatic pilot device 20 is based on one or several computation units integrated into one or several primary actuators 24, 26, 28 of the automatic pilot device. This makes it possible to limit the weight of the automatic pilot device 20. Furthermore, this eliminates lag times relative to an automatic pilot device comprising computers computing the setpoints, on the one hand, and primary actuators, on the other hand.

The automatic pilot device 20 can be made robust, in particular when at least two or each of the primary actuators 24, 26, 28 incorporate(s) a computation unit 40. Indeed, the computation units can perform redundant computations and/or monitor the operation of the different primary actuators 24, 26, 28.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An automatic pilot device for a rotary wing aircraft, comprising:
    at least one automatic pilot assembly, each automatic pilot assembly comprising at least two primary actuators configured to act on the aircraft, in which at least one or each of the primary actuators incorporates an electronic computation unit configured to:
        communicate with: i) a measuring system onboard the aircraft configured to generate measuring signals representative of flight parameters of the aircraft, and ii) a cockpit usable by a crew to pilot the aircraft and configured to generate control signals as a function of the actions by the crew, and
        compute, as a function of at least one of the measuring signals and the control signals, a piloting setpoint for the primary actuator incorporating at least one of the computation unit and a piloting setpoint for at least one other primary actuator of the automatic pilot assembly, for the piloting of the aircraft by the automatic pilot device.

2. The automatic pilot device according to claim 1, wherein at least one of the computation units is configured to compute a piloting setpoint for the primary actuator integrating the computation unit, the primary actuator being configured to apply this piloting setpoint.

3. The automatic pilot device according to claim 1, wherein each primary actuator incorporates the computation unit configured to compute a piloting setpoint for the primary actuator incorporating that at least one of the computation unit and the piloting setpoint for the at least one other primary actuator of the automatic pilot assembly.

4. The automatic pilot device according to claim 3, wherein each of the primary actuators is configured to apply a piloting setpoint computed by the computation unit integrated into the corresponding primary actuator.

5. The automatic pilot device according to claim 3, wherein at least one of the primary actuators is configured to provide a flight direction setpoint, and to control the display of the setpoint on a flight director.

6. The automatic pilot device according to claim 1, wherein at least one of the computation units is configured to compute, for at least one of the corresponding primary actuator and at least one of the other primary actuators of the automatic pilot assembly, a command piloting setpoint and a monitoring piloting setpoint in two different ways.

7. The automatic pilot device according to claim 1, wherein the automatic pilot assembly comprises at least one of: a primary actuator configured to act on the roll of the aircraft, a primary actuator configured to act on the pitch of the aircraft, and a primary actuator configured to act on the yaw of the aircraft.

8. The automatic pilot device according to claim 1, comprising a compensating assembly comprising at least one compensating actuator, at least one of the computation units integrated into a primary actuator being configured to compute a compensating setpoint for at least one of the compensating actuators.

9. The automatic pilot device according to claim 1, wherein at least one of the computation units is configured to compute, for at least one of the corresponding primary actuator and for at least one or each other primary actuator of the automatic pilot assembly, a guiding setpoint for guiding of the aircraft by the other automatic pilot device.

10. The automatic pilot device according to claim 1, comprising at least two automatic pilot assemblies, the respective primary actuators provided to act in parallel on the aircraft.

11. A rotary wing aircraft comprising an onboard measuring system configured to measure flight parameters of the aircraft, a cockpit usable by a crew to pilot the aircraft and an automatic pilot device according to claim 1.

* * * * *